F. W. ADSIT.
ALTERNATING CURRENT RECTIFIER.
APPLICATION FILED OCT. 22, 1915.

1,332,862.

Patented Mar. 2, 1920.
2 SHEETS—SHEET 1.

Inventor:
Frank W. Adsit,
by: C. Dursly
Attorney.

F. W. ADSIT.
ALTERNATING CURRENT RECTIFIER.
APPLICATION FILED OCT. 22, 1915.
1,332,862.
Patented Mar. 2, 1920.
2 SHEETS—SHEET 2.
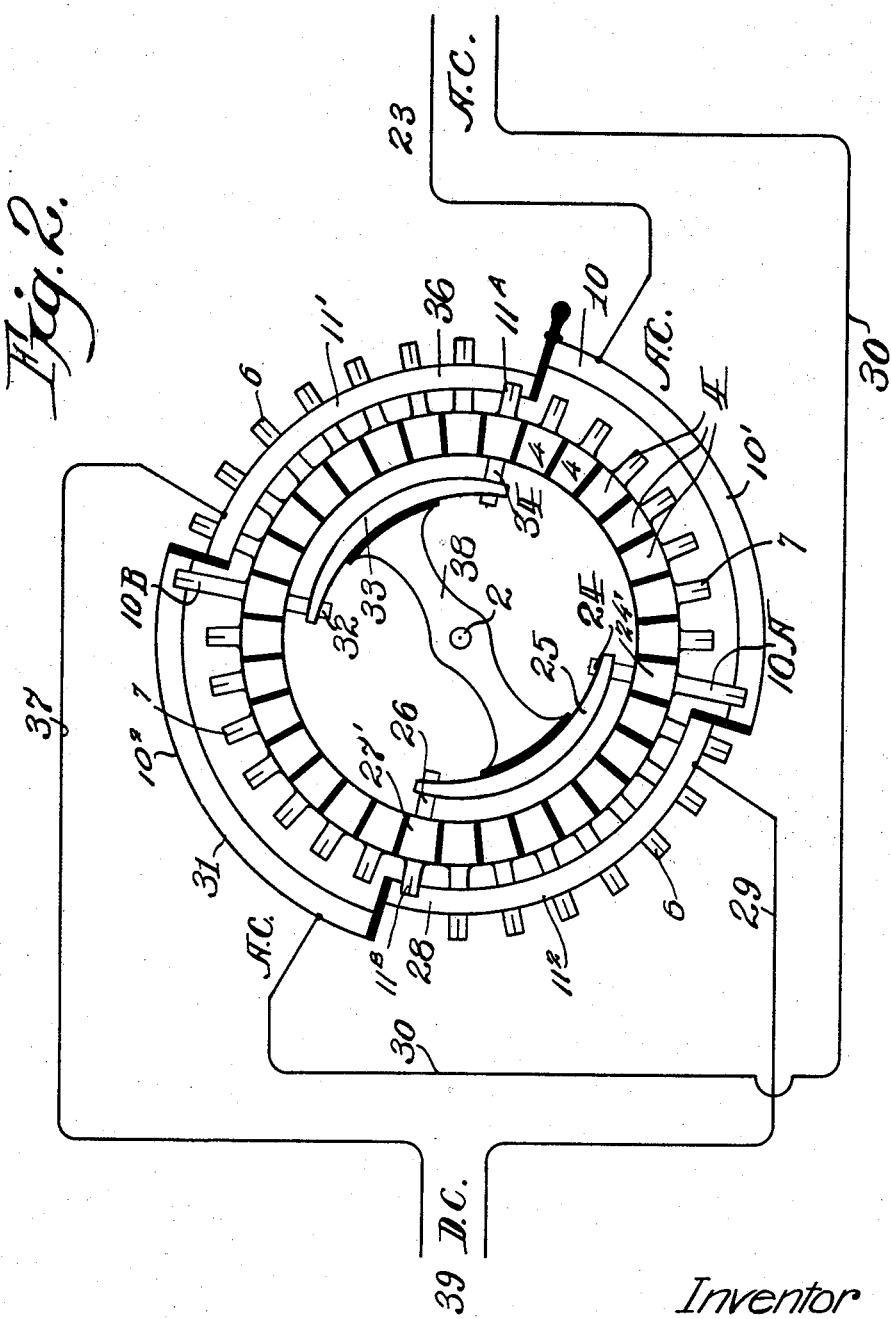
Inventor
Frank W. Adsit
by C. D. Enochs
Attorney

UNITED STATES PATENT OFFICE.

FRANK W. ADSIT, OF MINNEAPOLIS, MINNESOTA.

ALTERNATING-CURRENT RECTIFIER.

1,332,862.　　　　　Specification of Letters Patent.　　Patented Mar. 2, 1920.

Application filed October 22, 1915. Serial No. 57,309.

*To all whom it may concern:*

Be it known that I, FRANK W. ADSIT, a citizen of the United States, residing at Minneapolis, in the county of Hennepin, State of Minnesota, have invented new and useful Improvements in Alternating-Current Rectifiers, of which the following is a specification.

My invention relates to improvements in alternating current rectifiers of which the following is a full description, reference being had to the accompanying drawings forming a part of this specification.

One object of my invention is to provide a commutator adapted to be driven by a synchronous alternating current motor, connections being made by suitable brushes and contact members so that direct current of a pulsatory nature may be taken off of certain parts of the commutator directly from alternating current led into other parts of the commutator.

Another object of my invention is to provide means whereby the pulsations of current may be varied in duration while the rectifier is running.

Another object of my invention is to provide means whereby the pulsating wave taken off at the direct current side will be symmetrical in each half cycle.

Another object of my invention is to provide an oil tight case so the commutator and brushes coacting therewith may be run in oil, thereby preventing any arcing between the brushes and commutator segments under heavy loads.

Figure 1:
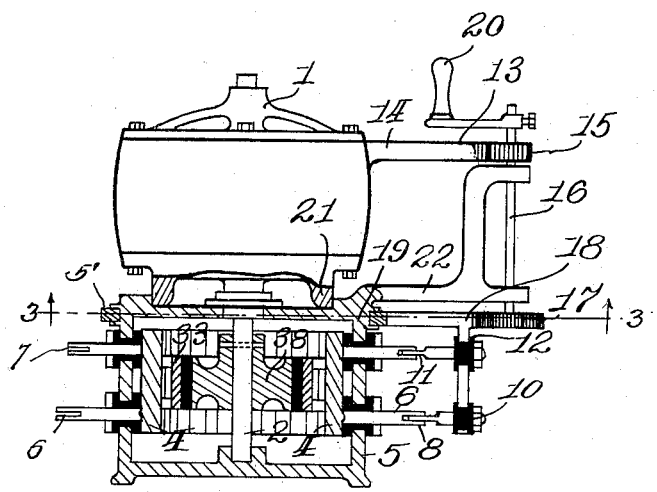

The drawings disclose in Figure 1 a view of the rectifier partly in section, and in Fig. 2 a diagrammatic view of the commutator brushes and wiring.

Figure 3:
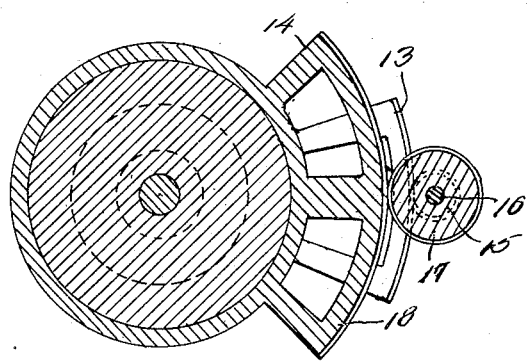
Figure 4:
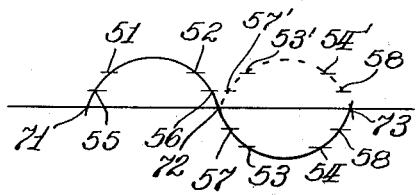

Fig. 4 is a diagrammatic representation of the current wave taken to show the portions of the current wave utilized in the rectifier under certain conditions; and Fig. 3 is a section taken on the line 3—3, Fig. 1.

This rectifier is particularly adapted for use in charging storage batteries of various capacities and voltages.

In common with many rectifiers of the type, it is designed to rectify alternating current obtained from a source of supply into a uni-directional current comprised of a series of pulsations.

A synchronous motor operated from the same source of alternating current is utilized to drive the rectifying means so as to, at all times, keep the rectifying means in synchronism with the alternating current that is being rectified.

In an alternating current circuit where a commutator is interposed which runs synchronously with the generator in said circuit a direct pulsating current may be obtained which ranges from zero to a maximum voltage, the maximum depending upon the construction of the machine.

While such current can be used for many purposes requiring direct current, it is not adapted for charging storage batteries or for the operation of the many continuous current motors and devices having a substantial counter-electromotive-force.

For instance, in the case of a storage battery, the instant the electromotive force of the charging machine falls below that of the storage battery, the battery will discharge current into the machine.

To obviate this difficulty, I provide, in my improved rectifier, apparatus which commutates or rectifies the alternating current impulses but collects and utilizes only that portion of the pulsations of which the electromotive force is equal to or higher than a certain voltage which is equal to or higher than that of the storage battery or the counter-electromotive force of the device being operated.

I also provide means for making the apparatus adjustable so the minimum voltage that is collected and rectified may be changed to suit the conditions under which the rectifier is being used.

Having described the principal purpose of my invention, I will now describe the mechanical structure of the device with reference to the drawings.

As shown in Fig. 1, a synchronous motor 1, mounted in a suitable frame or stator 21, is revolubly carried by a casing 5 of general cylindrical shape and fashioned to serve as an oil chamber.

The motor 1 carries an extended shaft 2 to which is keyed a pair of brush holders 25 and 33 carrying brushes adapted to make contact with commutator segments 4, as better shown in Fig. 2.

The cylindrical casing also carries a ring 5' revolubly mounted thereon and adapted to be angularly adjusted by the sector shaped arm 18. This sector shaped arm rigidly carries two segmental switch members 10 and 12 which are comprised of segments 10', 10², and 11', 11², respectively, Fig. 2.

These segmental switch blades are adapted to make contact with pins fashioned into switch jaws, and the blade 10' will make contact with one or more of the series of switch blades beginning with 10$^A$, the segment 10² will make contact with one or more of the series beginning with 10$^B$, the segment 11' will make contact with one or more of the series beginning with 11$^A$, and the segment 11² will make contact with one or more of the series beginning with 11$^B$.

An extension 14 of the stator 21 Fig. 1, carries thereon a gear quadrant 13 meshing with the gear 15, while the sector gear quadrant carried by the sector shaped arm 18 meshes with the gear 17. The shaft 16, carrying gears 15 and 17 keyed thereto, is revoluble by the crank 20 and the gear ratio of the gear 15, quadrant 13, and gear 17, and the gear carried by the sector 18 is such that the movement of the hand crank will turn the stator 21 through an arc equal to one-half that through which the ring 5', carrying the segmental switches 10 and 12, is turned.

It is apparent therefore that if the segmental switch members are advanced through an arc equal to that subtended by four of the switch pins shown in Fig. 2, then the stator 21 will be advanced through an arc equal to that subtended by two of the switch pins.

The representation of the current shown in Fig. 4 by the full line is that of the alternating current before it is rectified.

If the motor is in synchronism with alternating current led in at 23, Fig. 2, and the brush holder properly positioned on the shaft; when the brush holder is so angularly disposed that a single switch jaw is engaged by each of the segmental switch blades, that increment of the current taken off by the brush will be taken at the maximum voltage of the alternating current and the rectified uni-directional current will be composed of short impulses of current of maximum voltage.

If now the segmental switch blades are advanced so as to engage more of the switch jaws, it is evident that the impulses of the uni-directional current rectified will be of longer duration, hence these impulses will include not only the maximum voltage but a part of the current of a lower voltage.

If nothing was provided to make the current symmetrical, it is evident that each of the impulses would vary from the maximum voltage to a minimum voltage represented on the curve in Fig. 4 by the points 52 and 54', the dotted line showing the rectification of that portion of the current shown in full line just below the dotted representation.

However, as heretofore described, the stator is also advanced when the segmental switch blades are advanced and is advanced through an arc equal to one-half that through which the switch blades are advanced. It is therefore evident that each impulse of the current will be a uni-directional current beginning with a voltage less than the maximum of the current and increasing to that maximum and then decreasing to the same voltage at which the impulse started, so that the uni-directional current of each impulse is symmetrical with respect to the point of highest voltage of the current curve.

That portion of the curve represented between points 51 and 52 and between points 53' and 54' may represent such a uni-directional current taken off by the rectifier under a certain condition of the segmental switch and consequent stator advance.

If now the segmental switch blades are advanced a further amount the stator will be likewise advanced a further amount but only one-half that of the segmental switch blades advance so that the impulse taken off may be represented now by that portion of the curve lying between points 55 and 56, and 57' and 58'.

It will, accordingly, be understood that by means of the mechanical device illustrated and described, electrically connected as shown, any desired portion of alternating current brought in from the point 23, Fig. 2, may be rectified to a uni-directional current and led out at 39.

It will also be understood that the minimum voltage of the impulses of the uni-directional current so led out at 39, will depend upon the angular position of the crank handle 20, Fig. 1.

While I have described my invention and illustrated it in one particular design, I do not wish it understood that I limit myself to this construction, as it is evident that the application of the invention may be varied in many ways within the scope of the following claims.

Claims:

1. In an alternating current rectifier the combination of a casing, a stator revolubly mounted therein, contact making devices carried by and insulated from said casing, and segmental switches revolubly mounted on said casing and adapted to make contact with said contact making devices.

2. In an alternating current rectifier the combination of a casing carrying, revolubly mounted thereon, the stator of a synchronous alternating current motor, a ring revolubly mounted on said casing, a gear sector mounted on said ring, a second gear sector mounted on said stator, a shaft mounted in said casing and carrying two gears, one gear meshing with the sector carried by said ring and the other gear meshing with the sector carried by said stator, the gear ratios being such that the stator will turn through one-half the arc through which said ring is turned when said shaft is rotated; segmental switches carried by said sector on said ring, commutator segments carried by said casing and insulated therefrom and extending through said casing and terminating in external switch jaws, and a brush holder carried by the shaft of said motor and carrying brushes adapted to make contact with said segments.

3. In an alternating current rectifier the combination of a casing, commutator segments carried by said casing, contact making devices mounted for rotation in respect to said casing and having means of relative adjustment with said commutator segments, and angularly adjustable switch blades adapted to make electrical connection with said commutator segments.

4. In an alternating current rectifier the combination of rectifying brushes, rectifying commutator segments, means for connecting one or more of a set of said segments together, and means for advancing said connecting means with respect to the rotation of said brushes.

5. In an alternating current rectifier the combination of a suitably mounted series of commutator segments, rectifying brushes adapted to make contact with said segments, electrical connections whereby alternating current may be led to a portion of said segments and direct current rectified from said alternating current led from another portion of said segments, means for driving said brushes in synchronism with the alternating currents supplied to the rectifier, means for advancing or retarding the synchronous rotation of said brushes with respect to any given segment, and means for advancing said series of commutator segments one-half of the angular movement through which said brush is advanced.

FRANK W. ADSIT.